United States Patent [19]

Suzuki

[11] 4,003,258
[45] Jan. 18, 1977

[54] APPARATUS FOR DETECTING THE LEVEL OF A PARTICULATE MATERIAL
[75] Inventor: Minoru Suzuki, Yokohama, Japan
[73] Assignee: Richoh Co., Ltd., Japan
[22] Filed: Aug. 8, 1975
[21] Appl. No.: 603,034
[30] Foreign Application Priority Data
Aug. 13, 1974 Japan .................... 49-92618
[52] U.S. Cl. .................... 73/290 R; 200/61.21
[51] Int. Cl.² .................. G01F 23/00; H01H 36/00
[58] Field of Search .............. 73/290 R; 116/114 B; 200/61.21

[56] References Cited
UNITED STATES PATENTS 3,575,130 4/1971 Altmann ............... 200/61.21 X
3,896,279 7/1975 Sugawara ............... 200/61.21

Primary Examiner—Richard C. Queisser
Assistant Examiner—Joseph W. Roskos
Attorney, Agent, or Firm—McGlew and Tuttle

[57] ABSTRACT

An apparatus for detecting the level or quantity of a particulate material contained in a vessel by means of an agitating and/or delivering member while agitating the particulate material which needs to be agitated from time to time. The agitating member is arranged in the vessel for rotation about a horizontal axis, the center of gravity of the agitating member deviating from said horizontal axis. A driving and a driven disks disposed in spaced juxtaposed relationship constitute drive means for driving the agitating member. Arranged between the driving and driven disks is coupling means which, while permitting the disks to rotate relative to each other through a predetermined angle, connects the two disks to each other when the disks reach an end of said angle. Thus, when the agitating member is drawing, during its movement, near the upper surface of the particulate material in the vessel, it is disconnected from the drive source due to its eccentricity while the two disks are moving through said angle, and further moves by its own weight till it reaches the upper surface of the particulate material where it temporarily remains stationary. The angular position reached by the driven disk at this time indicates the level or the gravity of the particulate material in the vessel. Detection of the level of particulate material can be readily achieved by observing the angular relationship of the two disks at the time when the agitating member becomes stationary.

12 Claims, 14 Drawing Figures

APPARATUS FOR DETECTING THE LEVEL OF A PARTICULATE MATERIAL

BACKGROUND OF THE INVENTION

This invention relates to apparatus for detecting the level of a particulate material in a vessel and more particularly it is concerned with an apparatus for detecting the level of toner particles contained in a toner supply tank.

In electrophotographic copying apparatus in which developing is carried out by using a magnetic brush, the developing agent used consists of iron powder and toner adhered thereto and a magnetic brush is formed by the magnetic force of permanent magnets. The magnetic brush is brought into contact with an electrostatic latent image and causes the toner to adhere to the latent image to convert the same to a visible image. The concentration of the toner in the developing agent is gradually lowered as the cycle of developing operations is repeated, and thus it becomes necessary to detect the lowering of the concentration of the toner for supplying toner to the developing tank to replenish the toner therein. The toner to be supplied to the developing tank is stored in the toner supply tank beforehand.

If the toner supply tank runs out of toner and no toner is supplied to the developing agent tank, the toner concentration of the developing agent will be lowered and trouble will be caused in the developing operation. This makes it necessary to provide means whereby the level of the toner in the toner supply tank is detected and to give indication showing that the quantity of the toner in the toner supply tank has dropped below a predetermined level. In one method known in the art to detect the level of the toner in the toner supply tank, light is caused to be incident on the toner supply tank which is made of a transparent material or synthetic resin and the shadow of the toner formed at one end of the light is detected. In another method known in the art, a detecting member provided with blades is mounted in a toner supply tank which is rotated and the quantity of the toner is detected by the force of attraction of magnets and the resistance offered by the toner to rotation. These methods of the prior art have disadvantages in that the mechanisms for carrying the methods into practice and the control system therefor are complex in construction.

SUMMARY OF THE INVENTION

This invention has as its object the provision of an apparatus for detecting the level or the quantity of a particulate material contained in a vessel, the detection being carried out by a simple mechanism while the particulate material is being agitated in or delivered from the vessel.

The apparatus in accordance with the invention has particular utility in detecting and indicating the level of toner particles in a toner supply tank. The invention enables to detect and indicate the toner level automatically when the toner level has become lower than a predetermined level, without requiring to use the action of light or magnetism as has been the case in the prior art. Moreover, the invention obviates limits placed on the size of the toner supply tank in the prior art.

DETAILED DESCRIPTION OF THE PREFERRED EMBODIMENTS

Figure 1:
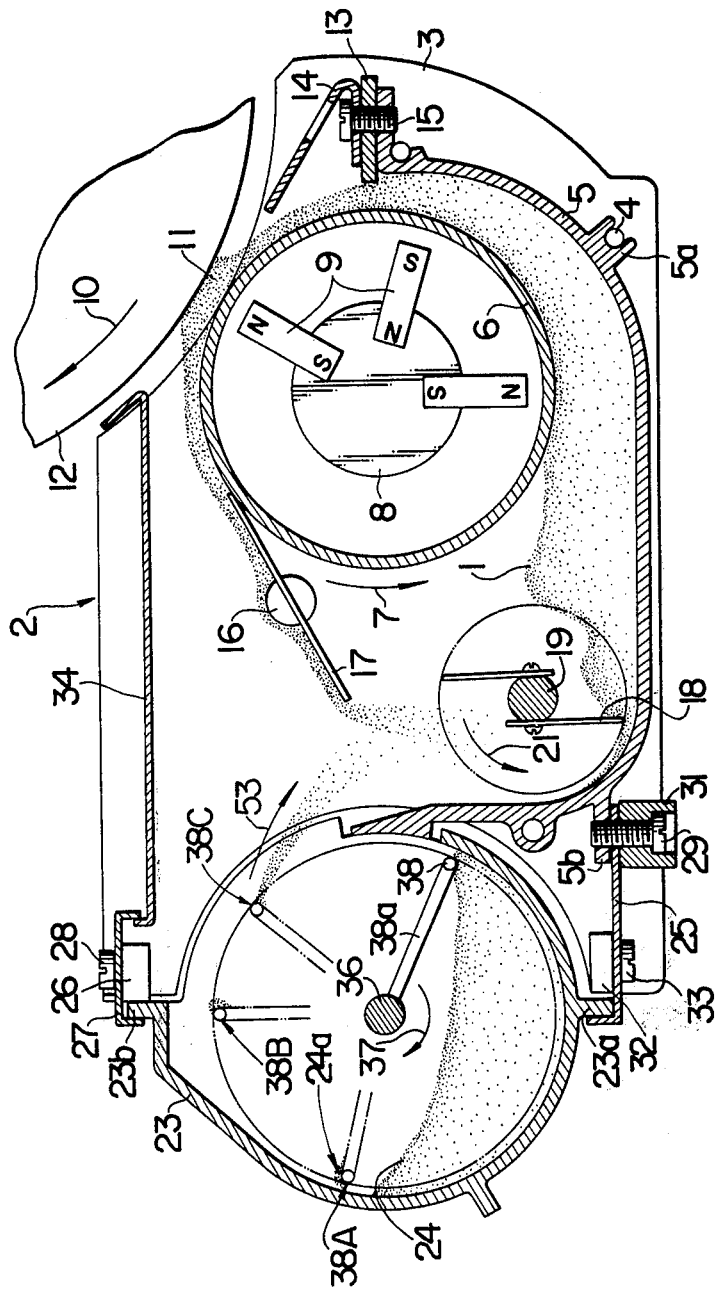
FIG. 1 is a front view of the tone level detecting apparatus comprising one embodiment of the present invention.

Preferred embodiments will now be described with reference to the drawings. In FIG. 1, a developing agent tank 2, containing therein a developing agent 1, comprises a pair of side plates 3 (only one is shown) a vessel 5 supported by the side plates 3 on a plurality of pins 4 which are secured to the plates 3 in forked portions 5a of the vessel 5. The developing agent tank 2 includes a sleeve 6 mounted therein and adapted to rotate in the direction of an arrow 7. A fixed rod or shaft 8, arranged longitudinally in the sleeve 6, has carries a plurality of permanent magnets 9 which are secured at their bases to the shaft.

The developing agent 1 comprises iron powder and toner adhered to the iron powder. The developing agent 1 is attracted by the magnetic force of the permanent magnets 9 to outer periphery of the sleeve 6 to form a magnetic brush 11 thereon. The magnetic brush 11 is maintained in contact with a drum 12 rotating in the direction of an arrow 10 to supply the toner to an electrostatic latent image formed on outer periphery of the drum 12 and to develop the same into a visible image. The image is printed by transfer printing onto a recording sheet (not shown) and fixed thereto. Arranged at a right end portion of a vessel 5 shown in FIG. 1 are a doctor blade 13 and an auxiliary cover 14 which are positioned so as to adjust the height of the magnetic brush 11 to a predetermined level. The doctor blade 13 and auxiliary cover 14 are secured by a screw 15 to the vessel 5. A scraping plate 17, secured by a shaft 16 to the side plates 3, has one end portion which is maintained in engagement with the outer periphery of the sleeve 6 to scrape away the developing agent which has been used for developing the latent image and return it to the developing agent tank 2. A plurality of agitating blades 18 are secured at their bases to a rotating shaft 19 and are loosely supported at respective opposite ends thereof by the side plates 3, 3. The shaft 19 and blades 18 rotate in the direction of an arrow 21 to agitate the developing agent 1 in the tank 2.

Arranged leftwardly of the developing tank 2 in FIG. 1 is a toner supply tank 23 in which toner particles 24 are contained. The toner supply tank 23 includes a projection 23a which is downwardly directed from the bottom thereof and rests on a support bar 25 and a projection 23b directed upwardly from the top thereof and held between an immovable block 26 and a retainer 27. The retainer 27 is secured by a screw 28 to the block 26 which is secured to the side plates 3. The support bar 25 is secured at its base to a projection 5b of the vessel 5 by a screw 29 and a washer 31 and secured at its free end portion by a screw 33 to a block 32 secured to the side plate 3. The toner supply tank 23 is open at its top as shown and communicates with the developing agent tank 2 disposed alongside thereof. A cover 34 supported at end portions by the side plates 3 is provided above the open top portion of the toner supply tank 23 and the developing agent tank 2.

A rotating shaft 36 arranged axially of the toner supply tank 23 is journalled in the side plates 3 and rotated in the direction of an arrow 37 by a drive mechanism subsequently to be described. Secured to the rotating shaft 36 are base ends of a pair of arms 35 (only one is shown) having other ends secured to opposite ends of a rod-like or wire-like member 38 disposed parallel to the shaft 36. Thus, this arrangement has its center of gravity at a position apart from the shaft 36 in the direction in which the arms 38 extend. The wire-like member 38 is disposed longitudinally of the toner supply tank 23 (perpendicularly to the plane of FIG. 1) and may be positioned as shown in this figure, at the same level as or slightly beneath the upper surface of the charge of the toner particles 24 in the tank 23 to detect the toner level in the tank 23 when no driving force is exerted thereon.

As shown, the member 38 is made of a piano wire, but the invention is not limited to this material. Any material which shows resistance to move into the upper surface of toner particles 34 may be used for making the member 38. The member 38, which is driven in the direction of the arrow 37, is cut off from its drive source before it reaches the upper surface of toner particles 24 and moves by its own weight to the upper surface of toner particles 24 although it may be slightly submerged in the toner partciles 24, thereby providing means to detect the toner level in the tank 23.

Arranged at the back of the side plate 3 shown in FIG. 1 or at one side of the toner supply tank 23 are a detecting or driven disk 41 (shown in FIG. 2) and a driving disk 42, the disks 41 and 42 being arranged coaxially. The driven disk 41 may be secured to one end of the shaft 36 and formed substantially integrally with the member 38, or connected to the shaft 36 through a joint so that the disk 41 may rotate together with the shaft 36 but can be disconnected axially therefrom. That is, since the toner supply tank 23 is detachably mounted with respect to the developing agent tank 2 such that it can be detached from the tank 2 by withdrawing the same vertically from the plane of FIG. 1, the detachable mounting of the toner supply tank 23 is facilitated if the shaft 36 and the detection disk 41 are connected through such a joint (not shown) as aforesaid. The detecting disk 41 which may be made of a material of low specific gravity has a small thickness and hence a low inertial mass and is formed at one portion of its periphery with a notch 41a which functions as a detecting portion.

Figure 3:
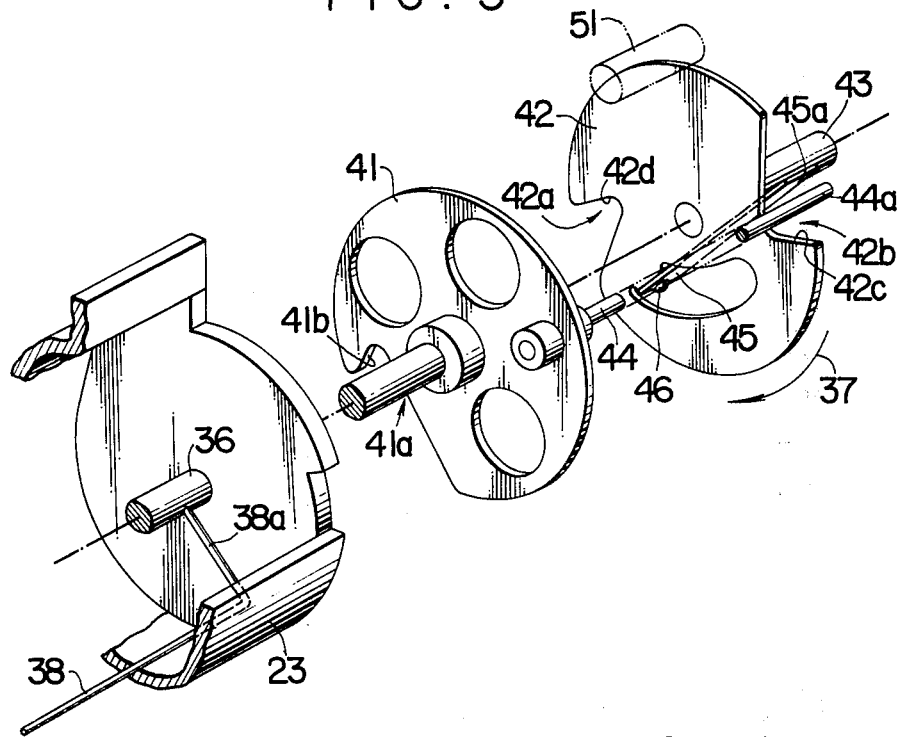
FIG. 3 is a perspective view of the detecting disk and the driving disk.

The driving disk 42 is secured to a shaft 43 (See FIG. 3) loosely supported by an immovable member (not shown) and connected to a motor (not shown) for driving the driving shaft 43 in the direction of the arrow 37 when the toner particles 24 are replenished. The driving disk 42 is formed in its periphery with a notch 42a functioning as a detecting portion and a notch 42b for effecting driving. A pin 44 connected at its base to the detecting plate 41 extends through the driving notch 42b and is positioned at its free end against a free end 45a of a plate spring 45. The plate spring 45 is secured at its base by a screw 46 to a bent portion 42e formed in the driving disk 42.

Figure 2:
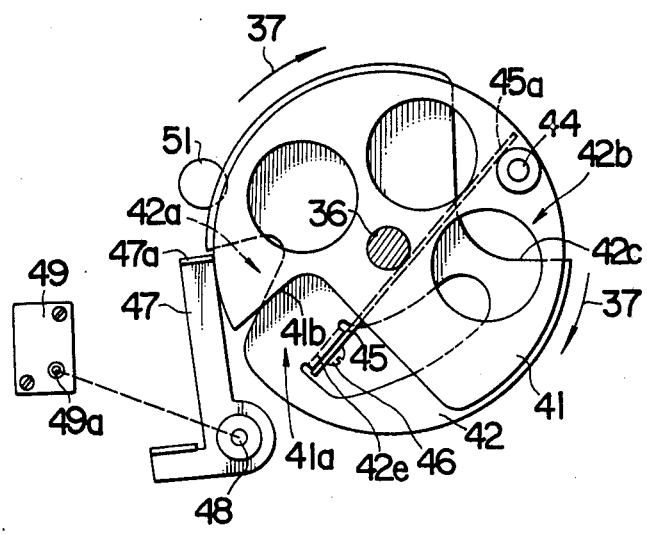
FIG. 2 is a front view of the driven or detecting disk and the driving disk which constitute the essential portions of the apparatus.

In FIG. 2, a bent portion 47a formed at a free end of an actuating member 47 is maintained in pressing engagement with peripheries of the detecting disk 41 and the driving disk 42. The actuating member 47 is secured at its base to a shaft 48 loosely supported by an immovable member (not shown) and urged by the biasing force of a spring (not shown) to move in a clockwise direction in FIG. 2. The shaft 48 is connected to a shaft 49a of a switch 49 affixed to an immovable member (not shown). Thus pivotal movement of the actuating member 47 causes the shaft 49a to rotate to thereby turn on and off the switch 49. A fixed pin 51 (See FIG. 4) affixed at its base to an immovable member (not shown) is disposed in the path of the free end 45a of the plate spring 45 and acts to flex the plate spring 45.

The concentration of the toner in the developing agent 1 in the developing agent tank 2 is lowered by the repetition of the cycle of copying operations. If the reduction in toner concentration is detected, then a signal is given to rotate the aforesaid toner replenishing motor (not shown). This causes the driving disk 42 to rotate in the direction of the arrow 37. As shown in FIG. 2, the pin 44 is disposed in a relatively large space between an edge 42c of the notch 42a of the driving disk 42 and the free end 45a of the plate spring 45 so that a predetermined angle of relief or backlash is provided between the driving disk 32 and the detection disk 41. Rotation of the driving disk 42 as aforementioned brings the free end 45a of the plate spring 45 into abutting engagement with the pin 44 to apply pressure thereto, thereby causing the detection disk 41 and the member 38 in the toner supply tank 23 to rotate in the direction of the arrow 37. When the member 38 rotates while agitating the toner particles 24 and emerges from the charge of toner particles 24 as shown at 38A in FIG. 1, a quantity of toner particles 24 is scooped up by the member 38. Since the toner 34 is in particulate form, the quantity of toner particles remains adhered to the member 38 while the member is rotating through a suitable range of angles.

Figure 4:
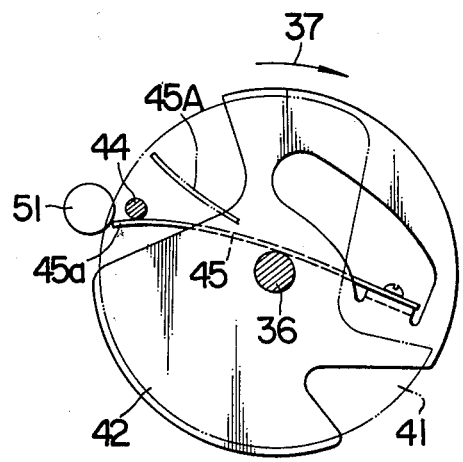
FIGS. 4 to 7 are views showing the relation between the detecting disk and the driving disk on one hand and the detecting member in the supply tank in various operation steps.

During the time the driving disk 42 is rotating in the direction of the arrow 37, the free end 45a of the plate spring 45 rotating together with the driving disk 42 is brought into abutting engagement with periphery of a fixed pin 51 as shown in FIG. 4. Further rotation of the driving disk 42 flexes the plate spring 45 as shown as so to thereby store energy in the plate spring 45. The pin 44 and the detection disk 41 which is integral with the pin 44 stop in the positions shown in FIG. 4 because the pin 44 is not pushed by the free end 45a of the plate spring 45 any longer. The member 38 which rotates together with the detecting disk 41 also stops in a position shown at 38B in FIG. 1. Further rotation of the driving disk 42 causes the free end 45a of the plate spring 45 to be released from abutting engagement with the fixed pin 51, so that the energy stored in the plate spring 45 is released and causes the spring 45 to move suddenly in the direction of the arrow 37 into a position 45A shown in imaginary lines in FIG. 4. This flips the pin 44 in the same direction. As a result, the member 38 which remained stationary in the position 38B suddenly moves into a position indicated at 38C, thereby throwing the toner particles 24a adhering thereto in the direction of an arrow 53. Thus a quantity of the toner particles 24 is supplied to the developing agent tank 2. This cycle of operations for replenishing the toner particles in the developing agent tank 2 is repeated till the concentration of toner in the developing agent 1 in the tank 2 reaches a normal value.

Figure 5A:
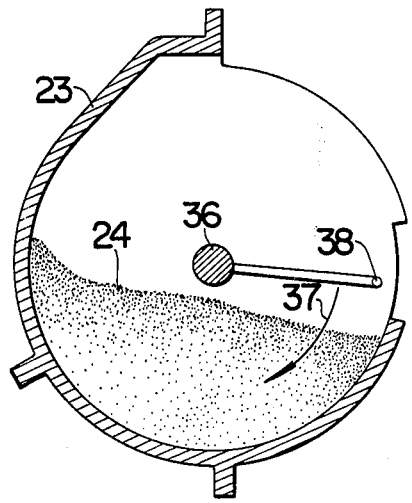
Figure 5B:
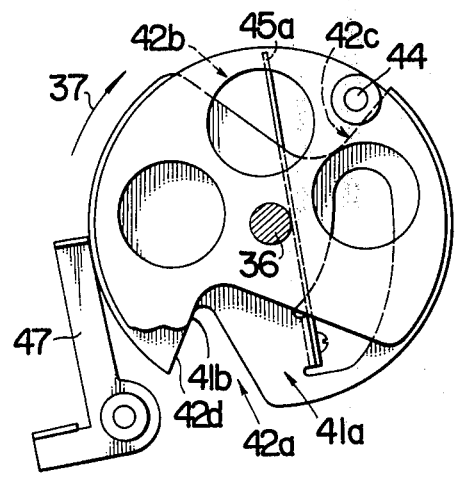

Sudden rotation of the pin 44 of the detecting disk 41 in the direction of the arrow 37 as it is flipped by the plate spring 45 is stopped as the pin 44 is brought into abutting engagement with the edge 42c of the notch 42b formed in the driving disk 42 as shown in FIG. 5 (b). Thereafter the pin 44 is moved together with the driving disk 42 while maintained in light engagement with the edge 42c by the weight of the member 38. That is, after releasing the toner particles 34, the member 38 moves in the same manner as the pin 44 or rotates in the direction of the arrow 37 as shown in FIG. 5 (a) till it rests on the upper surface of the toner particles 24 in the toner supply tank 23. Although the member 38 may be slightly submerged into the toner particles due to its own weight, it remains substantially on the upper surface of the toner particles 24 in the tank 23.

Figure 6A:
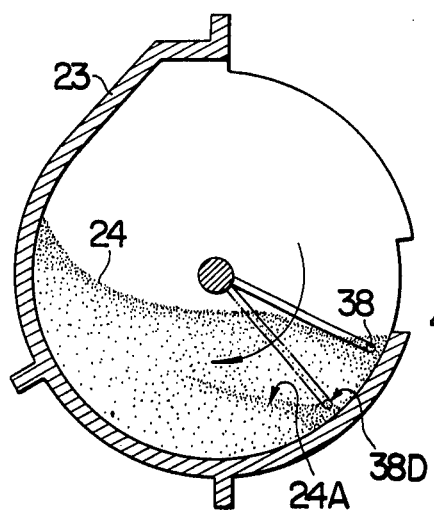
Figure 6B:
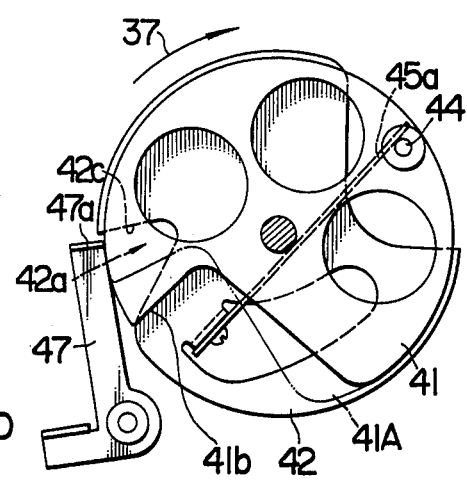

When the member 38 remains stationary on the toner particles 24 as shown in FIG. 6 (a), the detecting disk 41 remains stationary in a position shown in FIG. 6 (b), with the bent portion 47b of the actuating member 47 being maintained in pressing engagement with outer periphery of the disk 41. The distance between the bent portion 45a and an edge 41b of the notch 41a (detecting portion) of the detecting disk 41 represents the level of toner particles 24 in the tank 23. For example, if the level of the toner particles 24 is reduced to a level indicated at 24A in FIG. 6 (a) and the member remains stationary in a position shown by imaginary lines at 38D, the detecting disk 41 moving in conjunction with the member 38 is disposed in a position shown by imaginary lines at 41A in FIG. 6 (b). Thus, it will be seen that the edge 41b of the notch 41a is nearer to the bent portion 45a.

The detecting disk 41 rotates as the pin 44 is pressed by the plate spring 45 or moves by following the movement of the edge 42c of the driving disk 42 as aforesaid. Since the two disks 41 and 42 are connected to each other through the suitable relief angle therebetween, the member 38 is permitted to remain on the upper surface of the toner particles 24 within this relief angle. That is, although the detecting pin 44 stops following the movement of the driving disk 42 and remains stationary in a position shown in FIG. 6 (b), the pin 44 is again pushed and moved by the free end 45a of the plate spring 45 which rotates together with the driving disk 42. At this time, the member 38 moves through the toner particles 24 in the direction of the arrow 37 as aforesaid. When the pin 44 is in engagement with the edge 42c of the driving disk 42 as shown in FIG. 5 (b), the edges 41b and 42d of the notches 41a and 42a respectively coincide with each other as shown in FIG. 5 (b), and the two disks 41 and 42 rotate in the direction of the arrow 37 in this condition. As the level of the toner particles is detected by the member 38, the detecting disk 41 stops rotating while the driving disk 42 continues rotating, so that there occurs a phase difference between the two detecting portions 41a and 42a. This phase difference between the two detecting portions 41a and 42a keeps the bent portion 47a of the actuating member 47 from coming into engagement with the two detecting portions (notches) 41a and 42a. Thus the switch 49 (See FIG. 2) is not actuated.

Figure 7A:
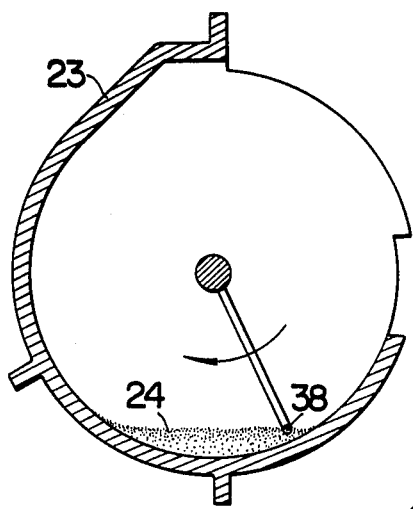
Figure 7B:
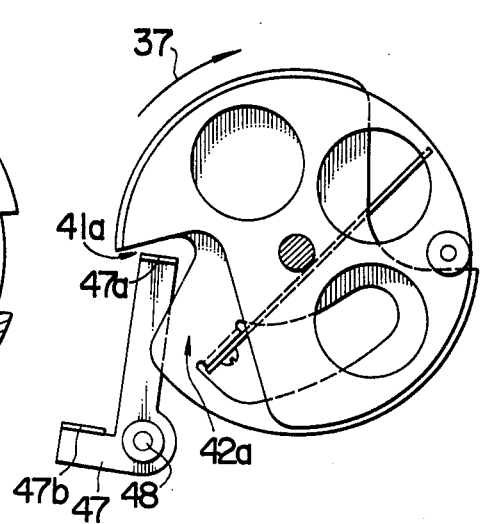

When the toner particles 24 in the toner supply tank 23 is reduced in quantity to a predetermined level shown in FIG. 7 (a), the toner level is such that the detecting disk 41 further moves in the direction of the arrow 37 from its position shown in FIG. 6 (b) to a position in which the notch 41a thereof coincides with the bent portion 46a of the actuating member 47. Stated differently, the detecting portions 41a and 42a are in phase with each other while coinciding with the bent portion 47a. The result of this is that the bent portion 47a falls into the detecting notches 41a and 42a as shown in FIG. 7 (b). This causes the actuating member 47 to move clockwise in pivotal motion from its position shown in FIG. 6 (b). The switch 49 is supported by a shaft 49a (See FIG. 2) which is coupled to the shaft 48 of the actuating member 47 and which is rotated clockwise, so that the switch 49 is turned on. Actuation of the switch 49 turns on an indication lamp (not shown), indicating that the quantity of the toner particles 24 in the toner supply tank 23 is below the predetermined value. After the switch 49 is turned on, a release mechanism (not shown) is actuated to press downwardly another bent portion 47b of the actuating member 47, so that the actuating member 47 is moved to and held in a position in which the bent portion 47a is released from engagement with the peripheries of the driving disk 42 and detecting disk 41.

It will be appreciated that in accordance with the present invention the level of the toner particles contained in the toner supply tank 23 can be positively and readily detected by utilizing the phase difference between the detecting disk 41 and the driving disk 42 or the relative positions thereof which vary depending on the position of the member 38 which is positioned on the upper surface of the toner particles 24 in the toner supply tank 23. If the toner level is reduced to a predetermined level, the reduction is not only detected but also automatically indicated. The member 38 performs the dual function of detecting the toner level and agitating the toner particles 24 in the tank 23 to prevent the toner particles uniting into coarse particles, in addition to supplying toner to the developing agent tank 2.

Figure 8:
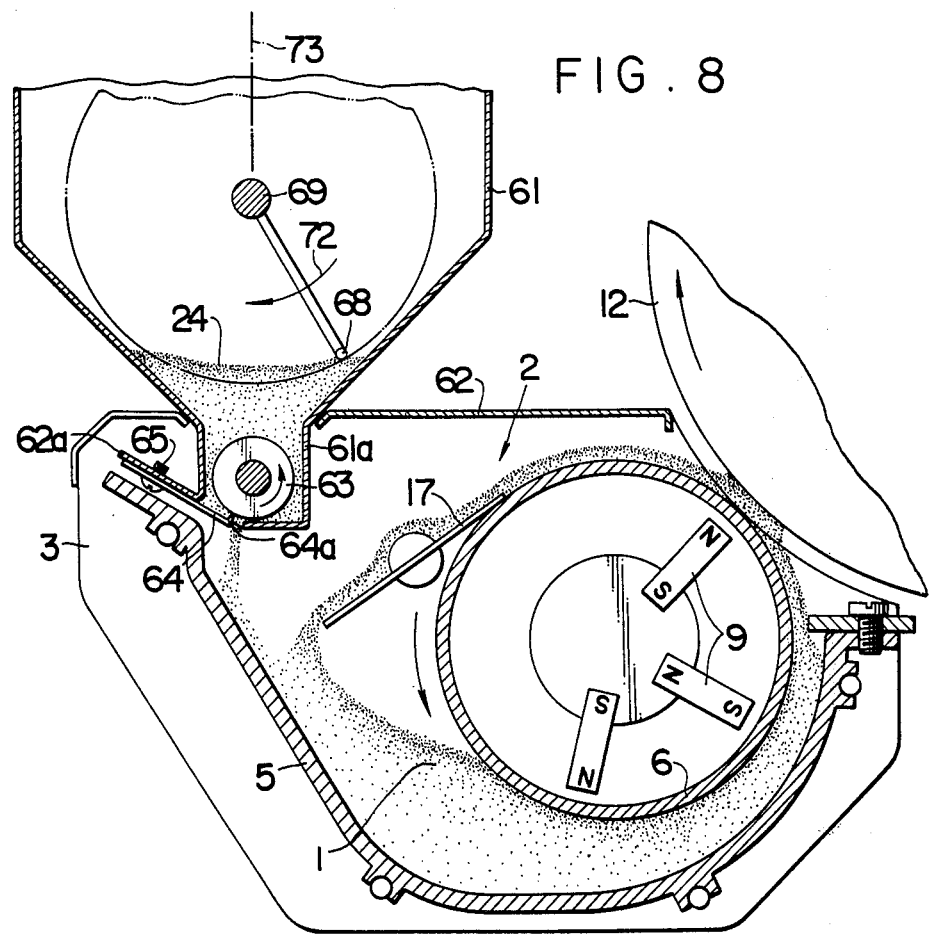
FIG. 8 is a front view of the toner level detecting apparatus showing another embodiment of the invention.

FIG. 8 shows another embodiment of the invention in which parts similar in function to those shown in the preceding figures are designated by like reference characters. In FIG. 8, a toner supply tank 61 is arranged above the developing agent tank 2 and formed at its bottom with a neck 61a which extends into the developing agent tank 2 through a hole formed in a cover 62 affixed to an upper portion of the side plate 3. Mounted in the neck 61a is a supply roller 63 which is adapted to rotate in the direction of an arrow only when toner particles are supplied from the tank 61 to the developing agent tank 2. A claw 64a formed at a free end of a vibration plate 64 is maintained in pressing engagement with a lower periphery of the supply roller 63. As shown, the neck 61a has an open portion at its bottom which is covered with the vibration plate 64 to prevent the falling of the toner particles 24 therethrough. The vibration plate 64 is secured at its base by a screw 65 to a bent portion 61b of the neck 61a.

Figure 9:
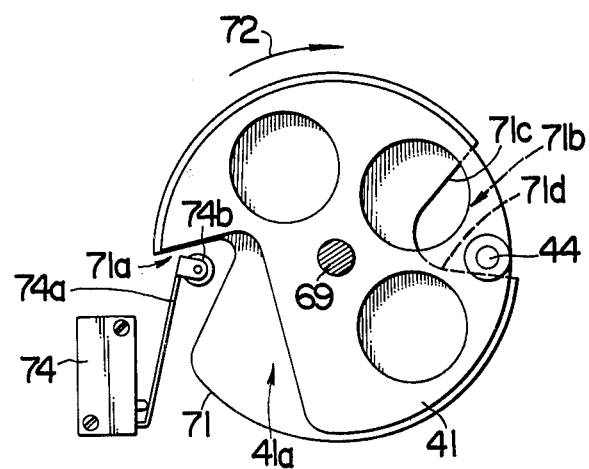
FIG. 9 is a front view of the detecting disk and the driving disk of the apparatus shown in FIG. 8.

A member 68 for detecting the toner level is disposed on the upper surface of the toner particles 24 in the tank 61 and connected at its opposite ends to arms secured at their bases to a shaft 69 rotatably connected to the toner supply tank 61. The shaft 69 extends at one end portion thereof out of the tank 61 and supports thereon the detecting disk 41 as shown in FIG. 9. A driving disk 71 which is mounted concentrically with the detecting disk 41 is connected to a drive (not shown) and rotated in the direction of an arrow 72 when toner particles are supplied from the supply tank 61 to the developing agent tank 2. The driving disk 71 is formed with a detecting notch 71a and a driving notch 71b, but the plate spring 45 (See FIG. 2) for turning the pin 44 is eliminated.

Upon detection of a reduction in the concentration of toner of the developing agent 1 by detecting means (not shown), the supply roller 63 and the driving plate 71 rotate in directions indicated by respective arrows. The free end of the vibration plate 64 vibrates when the supply roller 63 rotates, thereby dropping the toner particles 24 into the developing agent tank 2.

When the driving disk 71 rotates in the direction of an arrow 72 in FIG. 9, an edge 71c of the notch 71b pushes the pin 44, so as to thereby move the detecting disk 41 and the member 68 acting as a unit with the disc 41 in the same direction. If the member 68 rotating in the direction of the arrow 72 passes through a vertical axis 73 perpendicular to the shaft 69 and moves rightwardly of the vertical axis 73 as shown in FIG. 8, the torque produced in the member 68 will grow higher by its own weight. At this time, the pin 44 of the detecting disk 41 is brought into engagement with another edge 71d of the notch 71b and moves by following its movement. Accordingly, the member 68 moves in the direction of the arrow 72 and rests on the upper surface of the toner particles 24 in the tank 61, thereby detecting the level of the toner.

A roller 74b provided to an actuator 74a of a switch 74 is in pressing engagement with peripheries of the detecting disk 41 and the driving disk 71. If there is an abundant supply of toner particles in the toner supply tank 61 and the level of the toner particles therein is being detected by the member 68, the notch 41a of the detecting plate 41 and the detecting notch 71a of the driving disk 71 are out of phase with each other, so that the roller 74a is brought into engagement with neither of the detecting notches 41a and 71a. However, when the quantity of the toner particles 24 in the tank 61 is reduced below a predetermined value and the level of the toner particles is detected by the member 68, the detecting disk 41 and the driving disk 71 rotate while their detecting notches 41a and 71a are in phase with each other. Thus the roller 74b is brought into engagement with the detecting notches 41a and 71a as shown in FIG. 9 to thereby turn on the switch 74.

When the switch 74 is turned on, the reduction of the toner level below the predetermined value is detected and indicated by an indication lamp. It will be appreciated that the detecting disk 41 can be driven by the driving disk 71 only by utilizing two edges 71c and 71d of the notch 71b, and that the use of the plate spring 45, which is used in the first embodiment, is not essential. The most important feature of the present invention is the utilization of a difference in phase between the detecting disk 41 and the driving disk 71 (42 in the first embodiment) when the member 68 (38 in the first embodiment) is disposed on the upper surface of the toner particles in the toner supply tank and temporarily remains stationary for detection of the toner level. As in the first embodiment, the member 68 performs the function of agitating the toner particles 24 besides detecting the toner level in the tank 61. The member 68 is not directly concerned with the supply of toner particles to the developing agent tank 2. This makes it possible to increase the capacity of the toner supply tank 61 and store a large amount of toner particles therein.

In each of the aforementioned embodiments, the driving notch 42b is formed in the driving disk 42 and the pin 44 is affixed to the detecting disk 41. It is to be understood that the invention is not limited to this arrangement and that the same result can be achieved in driving the detecting disk by the driving disk by forming a driving notch in the detecting disk while affixing a pin to the driving disk. Also, the member 38 (68) need not be rotated in one direction alone. The detection of the level of the toner particles can be effected by providing a suitable mechanism between the detecting disk and the member 38 (68) whereby the member 38 (68) is permitted to move in oscillating motion while the detecting disk has been rotated in one direction.

Figure 10:
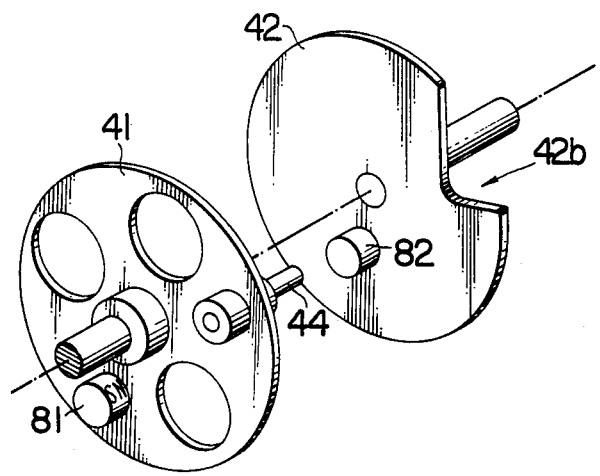
FIG. 10 is a perspective view of the detecting disk and the driving disk of one form of the detection means.

In the first embodiment described above, the detecting portions 41 and 42a formed in the detecting disk 41 and the driving disk 42 are in the form of notches formed in the respective disks. It is to be understood that the detecting portions are not limited to the notches. Instead, the detecting portions may comprise a magnet 81 and a lead switch 82 affixed to the detecting disk 41 and the driving disk 42 as shown in FIG. 10, for example. The magnet and lead switch are adapted to be brought in phase with each other when the toner level has been lowered below a predetermined value, thereby enabling to detect the toner level.

Figure 11:
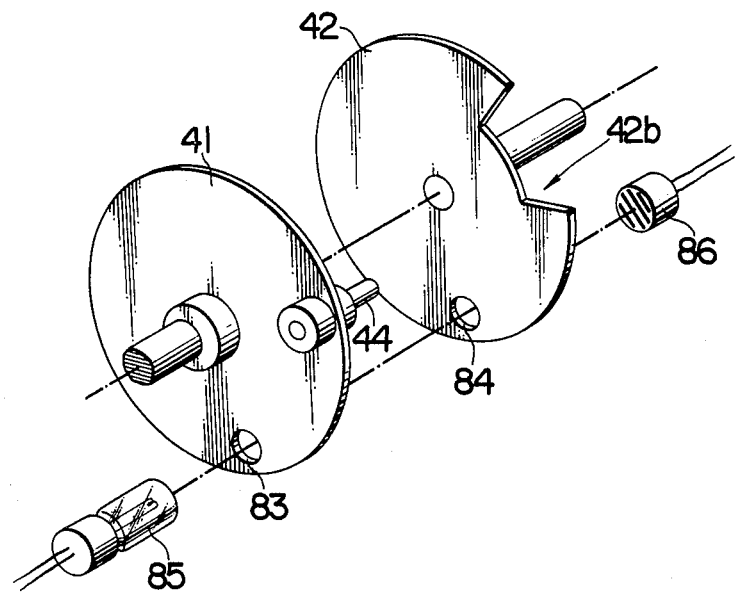
FIG. 11 is a perspective view of the detecting disk and the driving disk with other forms of the detecting portions.

Another form of detecting portions may include small holes 83 and 84 formed in the detecting disk 41 and the driving disk 42 respectively and arranged in the same radial distance from the center of the disks as shown in FIG. 11. A light source 85 and a light receiving element 86 are arranged such that the light emitted by the light source can pass through the holes 83 and 84 and be incident on the light receiving element 86. If the holes 83 and 84 are brought in phase with each other and indexed with the light source 85 and the light receiving element 86, the light from the light source 85 will be incident on the light receiving element 86, thereby indicating that the toner level is reduced below a predetermined value.

In accordance with the present invention, it is possible to accurately detect the level of the charge of the toner particles in the toner supply tank by utilizing the difference in phase between the detecting disk, which rotates with the detecting member as a unit, and the driving disk for driving the detecting disk, while the detecting member which can also function as an agitator temporarily stops on the upper surface of toner particles during its movement about a horizontal axis.

What is claimed is:

1. An apparatus for detecting the level of a particulate material contained in a vessel comprising:
   a. a driven member rotatable about a horizontal axis in said vessel, a material engaging member affixed to said shaft and having a portion extending radially from the axis of rotation of said shaft and being rotatable with said driven member, said material engaging member having its center of gravity at a position based on the axis of rotation of said driven member;
b. a driving rotary member disposed in spaced aligned relationship to said driven member and being rotatable in a driving condition and being non-rotatable in a detection condition during which time said material engaging member falls by the influence of gravity onto the surface of the material;
c. a lost motion drive connection between said driven rotary member and said driving rotary member, permitting relative rotation therebetween through a predetermined angle and the driving of said driven member by said driving member; and
d. means for detecting the angular position of said driven rotary member when said driving member is in a detection condition, at which time said material engagement member rests on the upper surface of the particulate material in the vessel, and in arriving in this position, rotates said driven member through an angle relative to said driving member, in accordance with the level of the material and the movement of said material engagement member under the influence of gravity to the surface of the material.

2. An apparatus according to claim 1, wherein said rotatable driven member comprises a shaft arranged horizontally for rotation in said vessel, said material engaging member comprising a pair of arms fixed at their bases to opposite end portions of said shaft and extending radially and parallel to each other, and a wire like member connected between said arms.

3. An apparatus according to claim 1, wherein said driven rotary member and said driving rotary member are in the forms of disks, and said coupling means comprises a notch formed in one of said disks and a pin affixed to the other disk which is permitted to rotate through said predetermined angle relative to said one disk between opposite ends of said notch.

4. An apparatus according to claim 3, wherein said disks are each formed therein with another type of notch, said another type of notches of said two disks not overlapping each other when the disks are at one end of said angle and overlapping each other when the disks are at the other end thereof, and said detecting means is disposed in a position which corresponds to a temporary stationary position in which said notch of the driven disk is disposed as said diving member is located on the upper surface of the particulate material when the level of the particulate material is below a predetermined value, thereby detecting the overlapping of said another type of notches.

5. An apparatus according to claim 4, wherein said detecting means comprises a movable member urged to fall into said another type of notches when they overlap each other.

6. An apparatus according to claim 4, wherein said detecting means comprises a photoelectric detector.

7. An apparatus according to claim 3, wherein said vessel is formed with an outlet port in one part of its upper half portion, and further comprising means for temporarily accelerating said diving member when the diving member draws near said outlet port.

8. An apparatus according to claim 7, wherein said accelerating means comprises a plate spring attached at its base to the disk which is formed therein with the first mentioned notch and including a free end portion which extends by the rear of said pin and projects somewhat radially, and a stationary stopper for engaging with the free end of said plate spring at it rotates but permitting it to be releases from engagement therewith by the subsequent flexing of the plate spring.

9. A device for detecting a level of powdered material in a vessel and particularly for detecting the amount of powdered toner in an electrophotographic coupling apparatus, comprising a vessel adapted to contain a powdered material, a driven shaft rotatably supported in said vessel, a material engaging member affixed to said driven shaft for rotation therewith, and having a portion extending radially outwardly from the center of rotation of said driven shaft which is movable through the powdered material in the vessel upon rotation of said shaft, and is engageable due to its weight by the action of gravity on the surface of the material in a detecting position when said driven shaft is not rotated; a detecting disk affixed to said driven shaft and being rotatable therewith, and having a peripheral detection surface and a recess extending radially inwardly of said detection service; a drive shaft rotatably mounted concentrically to and adjacent said driven shaft; a drive disk alongside said detective disk and affixed to said drive shaft for rotation therewith, and having a peripheral drive disk surface with a detection notch extending radially inwardly from said drive disk detection surface which notch is alignable with the recess of said detecting disk in the detecting position of said detecting disk and said material engaging member; a lost drive connection between said drive shaft and said driven shaft permitting relative shifting movement of said drive disk and said detecting disk in a manner so that the recess of said detecting disk and the detecting notch are not aligned when said drive shaft is driving said driven shaft in a driving position of said disk, but which are aligned in a detecting position with the material engagement member engaged on the surface of the material and in an amount in accordance with the position of the material engagement member on the material which depends on the level of the material in the vessel, and indicating means including an indicating member engaged on the surfaces of said detecting disk and being movable into the recess of the detecting disk to an extent to contact a portion of the drive disk adjacent the drive disk detection notch, and means for indicating the amount of movement of said indicating member.

10. A device according to claim 9 wherein said lost motion drive includes a pin affixed to said detecting disk, said drive disk having a drive notch extending inwardly from its peripheral surface, said pin of said detecting disk extending into said drive notch and bearing against a portion of said disk bounding one side of said drive notch during rotation.

11. A device according to claim 10, including a spring carried on said drive disk and being engageable behind said pin to drive said detecting disk through said pin, and a fixed pin positioned in the path of movement of said spring and engageable with the outer edge of said spring during rotation thereof, to hold said spring to build up a spring force and thereafter release said spring against said pin to propel said pin to thereby accelerate said driven member and said material engaging member to cause it to hurl the material picked up thereby out of said vessel.

12. A method of indicating the level of powdered material in a closed vessel having a rotary shaft with a portion in the vessel having a material pickup member which extends radially outwardly from the center of rotation and which is adapted to be driven so that it moves through the material and when not driven rests on the surface of the material, and which also includes a portion of said shaft extending out of said vessel, comprising driving the rotary member to move the pickup portion through the material to remove portions of the material with the pickup member during rotation, and discontinuing the rotation and permitting the pickup member to fall onto the surface of the material, and noting the rotational position of the shaft at the exterior of the vessel as an indication of the level of the material remaining in the vessel.

* * * * *